J. C. BEEKMAN.
Assignor to THE BEEKMAN SALUTARY SYSTEM COMPANY.
WATER CLOSET BOWL.
No. 11,242. Reissued June 7, 1892.
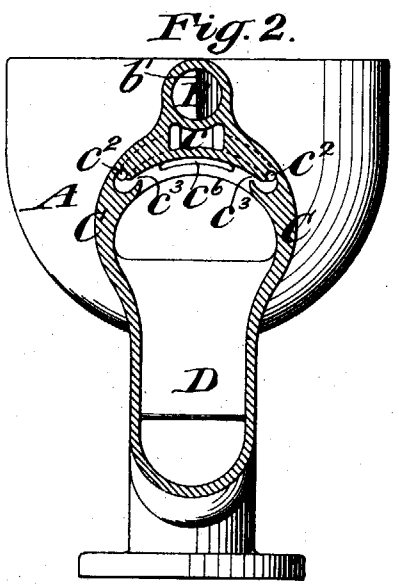
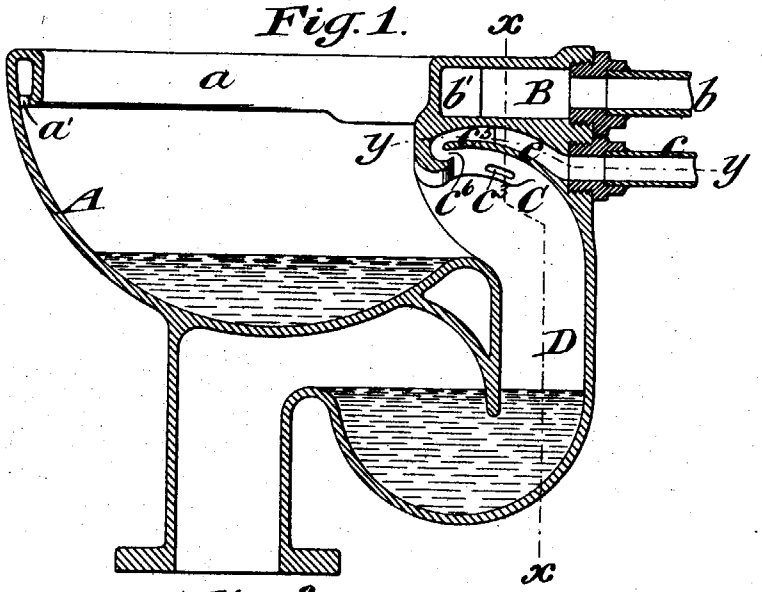
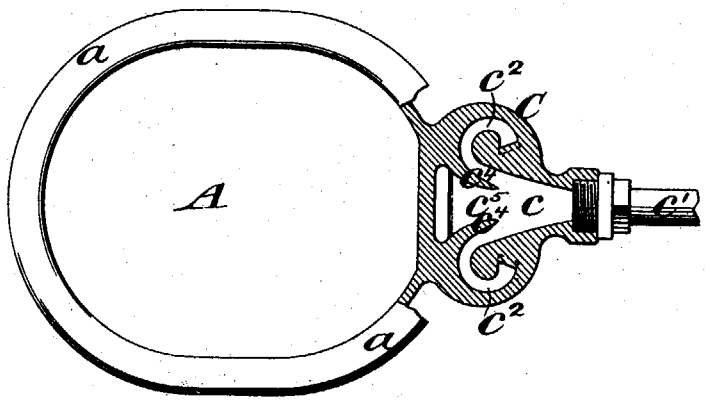
Witnesses:
C. L. Sundgren
George Barry.
Inventor:
John C. Beekman
by attorneys
Brown & Seward
THE NORRIS PETERS CO., PHOTO-LITHO., WASHINGTON, D. C.

UNITED STATES PATENT OFFICE.

JOHN C. BEEKMAN, OF NEW YORK, N. Y., ASSIGNOR TO THE BEEKMAN SALUTARY SYSTEM COMPANY, OF NEW JERSEY.

WATER-CLOSET BOWL.

SPECIFICATION forming part of Reissued Letters Patent No. 11,242, dated June 7, 1892.

Original No. 452,963, dated May 26, 1891. Application for reissue filed November 11, 1891. Serial No. 411,642.

*To all whom it may concern:*

Be it known that I, JOHN C. BEEKMAN, of the city of New York, in the county of New York and State of New York, have invented a certain new and useful Improvement in Water-Closet Bowls, of which the following is a specification.

My invention relates to an improvement in water-closet bowls, and has for its object the provision of a second flush, by which that part of the bowl in the vicinity of the discharge-conduit receives after the first flush a second flush in such a direction as to effect a thorough cleansing of the bowl.

A practical embodiment of my invention is represented in the accompanying drawings, in which—

Figure 1 is a vertical central section taken through the flush-inlets and the discharge-conduits from the bowl. Fig. 2 is a transverse vertical section through the line $x\ x$ of Fig. 1; and Fig. 3 is a top plan view of the bowl, taken partly in section through the line $y\ y$ of Fig. 1 to more clearly show the construction of the second-flush mechanism.

A represents the body of the bowl, provided with a flushing-rim $a$, extending around its upper portion, and having flushing-orifices $a'$ formed at intervals in its lower portion. The inlet-chamber B receives the flushing-water from the supply-pipe $b$, leading to a suitable supply-tank, (not shown,) and within the chamber B the inner wall of the flushing-rim $a$ presents a wedge-shaped projection $b'$ toward the direction of the inflowing stream of water, which projection serves to separate the stream of water and direct it in opposite directions around the flushing-rim $a$. The construction of the bowl, the flushing-rim, and the water-inlet chamber as thus far described is of the same general structure as that shown and described in Patent No. 396,623, granted to S. F. Sniffen January 22, 1889.

Between the inlet-chamber B and the upper end of the discharge-conduit D there is provided a laterally enlarged and thickened portion C, within which a second-flushing chamber is formed and supplied as follows: The body portion $c$ of this second-flushing chamber connects at its outer end with a supply-pipe $c'$, which leads to a suitable flushing-tank. (Not shown.) From the body portion $c$ of the second-flushing chamber extend conduits $c^2$, preferably curved to the right and left and open downwardly, as shown at $c^3$, into the upper portion of the discharge-conduit D at the right and left of the center. Another portion $c^5$ of the flushing-chamber $c$, separated from the laterally-extending conduits $c^2$ by partitions $c^4$, extends toward the bowl and opens downwardly through an elongated mouth into the upper central portion of the discharge-conduit D.

As here shown, the flushing-chamber $c$, from a substantially cylindrical form at the point where it connects with the pipe $c'$, gradually flattens and increases in width as it extends toward the bowl, and the water therefrom will be discharged in three separate streams through the openings $c^3$ $c^6$ in such a position and in such direction as to effect a thorough cleansing of that portion of the bowl around the upper end of the discharge-conduit D.

It is obvious that the supply-pipes $b$ and $c'$ may lead either to the same tank or to separate tanks, and that they may be supplied by independent valves under the control of independent operating devices, or they may be supplied by an automatic double-flush tank under the control of a single operating device of the general construction shown and described in my pending application entitled the "Double-Flush Tank for Water-Closets," executed and filed of even date herewith, Serial No. 355,112.

What I claim as my invention is—

1. A water-closet bowl provided with a flushing device adapted to discharge water around the rim of the bowl, and a second flushing device consisting of a flushing-chamber provided with water-conduits leading to the right and left and with a water-conduit intermediate of those leading to the right and left, the said conduits above the overflow opening into the upper portion of the discharge-conduit from the bowl, substantially as set forth.

2. A water-closet bowl provided with a thickened portion, an inlet for the discharge of water around the interior of the body of the bowl, and a second inlet-chamber formed in the thickened portion of the bowl and opening into the discharge-conduit forming an independent flush for the walls of the neck of the discharge-conduit, substantially as set forth.

JOHN C. BEEKMAN.

Witnesses:
FREDK. HAYNES,
GEORGE BARRY.